Patented July 30, 1940

2,209,545

UNITED STATES PATENT OFFICE 2,209,545

PROCESS FOR REFINING ROSIN AND SOLVENT THEREFOR

Edward M. Toby, Jr., New Rochelle, N. Y., assignor to American Mineral Spirits Company, Chicago, Ill., a corporation of Illinois No Drawing. Application September 13, 1939, Serial No. 294,669

4 Claims. (Cl. 260—107)

This invention relates to the method of decolorizing rosin and to a novel solvent therefor.

In the preparation of wood rosin it is customary to subject wood chips or wood in other suitable comminuted form and size to cooking with live steam in order to remove the turpentine and part of the pine oil and then subject the resulting material to extraction with a petroleum solvent to dissolve out the remaining pine oil and rosin. The solvent is finally separated from the rosin by distillation. The resulting rosin has an objectionable dark color. Various processes have heretofore been proposed for producing pale colored rosin, such as extraction with selective solvents as furfural and filtration of rosin solution through absorptive clay. Re-extraction with various hydrocarbons or mixtures thereof such as those set forth in the patents to Bent Re. 19,749 and Waligora 2,142,592 has also been suggested.

I have discovered that, if the dark colored rosin is re-extracted with a paraffinic or iso-paraffinic hydrocarbon solvent liquid at normal atmospheric conditions but having a low boiling range, it can be converted economically into a pale or light colored rosin.

The solvent in accordance with my invention is a hydrocarbon fraction having the following characteristics.

| | |
|---|---|
| Initial boiling point | Approximately 92° F. |
| 50% point | Approximately 100° F. |
| End boiling point | Approximately 145° F. |
| U. O. P. characterization factor | Above 12 |
| Kauri butanol value | Under 30 |
| Aniline point | Above 140° F. |
| A. P. I. gravity | About 90.6 |
| Specific gravity | About 0.67 |

The solvent is composed almost entirely of a mixture of pentanes and hexanes having less than 2% of unsaturates, aromatics, and naphthenes. It is essential that the constituents of the solvent be paraffinic since it is the paraffinic nature of these materials which gives them the selectiveness in removing color bodies from the rosin.

The solvent can be prepared by separating pentanes and hexanes from wet natural gas by well-known absorption methods and closely fractionating the recovered liquid fraction so that the resulting material boils within the limits above specified. The solvent may also be prepared from crude oils containing light fractions by fractional distillation and subsequent refining with selective solvents such as sulfur dioxide or by treatment with sulfuric acid or chlorsulfonic acid followed by clay. These methods of refining hydrocarbon distillates to remove unsaturates, naphthenes, and aromatics are well known in the art and require no detailed explanation.

In decolorizing the rosin it is mixed with sufficient solvent to dissolve it, for example one part by weight of rosin may be dissolved in from one to ten parts by weight of solvent in a suitable vessel. The extraction may be done either at normal temperatures or at elevated temperatures, preferably below the boiling point of water. If elevated temperatures are used, an autoclave is preferably used which is capable of withstanding the pressure resulting from the heating of the solvent. However, a still equipped with a reflux condenser can be used equally well. The color producing bodies remain undissolved and may be separated from the solution of the rosin in the solvent either by decantation or filtration. The resulting solution is distilled to separate off the solvent from the rosin. The resulting rosin is a pale yellow which commands a higher price in the market than the dark colored starting material.

As an example of the results obtained a grade of rosin known as FF wood rosin was extracted with a solvent obtained from natural gas by absorption, having an I. B. P. of 96° F. and an E. P. of 139° F., a kauri butanol value of 25, and a U. O. P. characterization value over 12. The solvent was contacted with the rosin in the amount of eight parts by weight of solvent to one part of rosin. The resulting rosin solution was very light in color and, when the solvent was evaporated off, the rosin was a light straw color, corresponding to X grade wood rosin or lighter. The residue was dark brown in color.

The extraction of another sample of the same rosin was repeated but in this case the solution was heated to approximately 150° F. The decolorized rosin was substantially of the same color as that obtained in the cold extraction.

A comparison of results obtained by using a solvent within the scope of my invention, and fractions of higher or lower boiling range, has shown that better decolorization and a lighter colored product can be obtained using my solvent than can be obtained with lighter or heavier fractions.

I claim:

1. The method of decolorizing rosin which consists in dissolving one part of rosin in from one to ten parts by weight of petroleum hydrocarbon solvent composed of pentanes and hexanes boiling within the range of 92–145° F., said solvent having a U. O. P. characterization factor above 12, a kauri butanol value under 30 and an aniline point above 140° F., separating undissolved constituents from the solution and separating by distillation the solvent from the dissolved rosin.

2. Method in accordance with claim 1 in which the solvent has a boiling range of approximately 92° F. to 145° F. and a 50% boiling point of approximately 100° F.

3. The method of decolorizing rosin which consists in dissolving one part of rosin in from one to ten parts of petroleum hydrocarbon solvent composed of pentanes and hexanes boiling within the range of 92–145° F., said solvent containing less than 2% of unsaturated, aromatic and naphthenic compounds, separating undissolved constituents from the solution and separating by distillation the solvent from the dissolved rosin.

4. Method in accordance with claim 3 in which the solvent has a boiling range of approximately 92° F. to 145° F. and a 50% boiling point of approximately 100° F.

EDWARD M. TOBY, Jr.